Nov. 7, 1950 — W. J. PREISING ET AL — 2,528,607
ADJUSTABLY MOUNTED SEAT
Filed July 7, 1948 — 2 Sheets-Sheet 1

INVENTORS
WILLIAM J. PREISING
ROY H. BYNUM
BY Arthur Robert
ATTORNEY

Nov. 7, 1950   W. J. PREISING ET AL   2,528,607
ADJUSTABLY MOUNTED SEAT

Filed July 7, 1948   2 Sheets-Sheet 2

INVENTORS
WILLIAM J. PREISING
ROY H. BYNUM
BY
Arthur Robert
ATTORNEY

Patented Nov. 7, 1950

2,528,607

UNITED STATES PATENT OFFICE 2,528,607

ADJUSTABLY MOUNTED SEAT

William J. Preising, New Albany, Ind., and Roy H. Bynum, Louisville, Ky., assignors to B. F. Avery & Sons Company, Louisville, Ky., a corporation of Delaware Application July 7, 1948, Serial No. 37,426

8 Claims. (Cl. 155—121)

1

This invention relates to an adjustable seat mounting particularly adapted for use on a tractor.

In the operation of a tractor in plowing land, the wheels on one side of the tractor ride in a plowed furrow while the wheels on the other side ride on unplowed land, so that the tractor is canted to one side. Under such conditions the operator sits in bent over position, which induces considerable strain and fatigue. In terrace plowing a similar condition exists which is more or less aggravated by the slope of the terrain.

It is an object of the present invention to provide a tractor seat support which enables the seat to be canted laterally so as to maintain the seat substantially horizontal when the tractor is canted sidewise.

A further object is the provision of a tractor seat which can be adjusted about a horizontal axis, and which includes shock absorbing means operative in any adjusted position of the seat.

Still another object is the provision of a tractor seat adjustable about a horizontal axis to a plurality of predetermined angular positions and which is supported in cushioned relation in such adjusted position.

Another object is the provision of a cushioned tractor seat adjustable in a plurality of predetermined positions and providing limiting means to prevent accidental displacement from an adjusted position.

For a detailed description of the invention reference is had to the following specification taken in connection with the accompanying drawings wherein is illustrated a preferred embodiment of the invention by way of example, and wherein.

Figure 1:
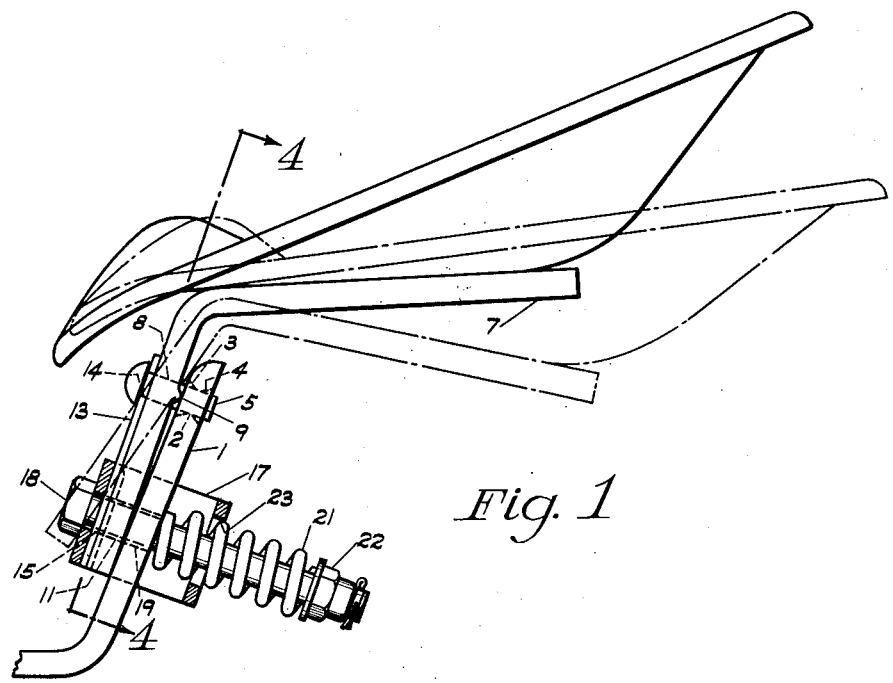
Figure 1 is a side view partly in section of the invention.

Referring to the drawing, there is shown a support 1 in the form of an upwardly bent bar or post adapted to be rigidly secured at its lower end to a tractor or the like. Near its upper end the post 1 is bored at 2, the ends of the bore being tapered, as at 3, and 4. An angular seat bracket 7 which carries a seat of any suitable type, is bored at 8 to receive the pivot pin 5, which has a forced friction fit in bore 8, so that it is locked therein and extends through bore 2. Bracket

2

7 has horizontal bearing ribs 9 at either side of the bore which are adapted to engage the forward face of the post 1.

Figure 4:
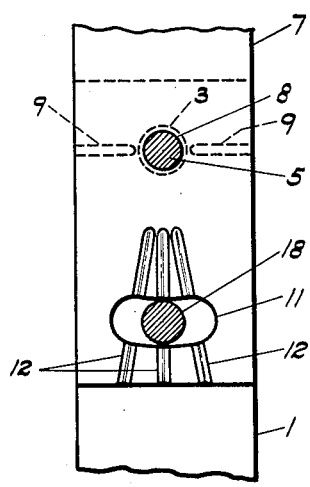
Figure 4 is a sectional view taken on line 4—4 of Figure 1.
Figure 5:
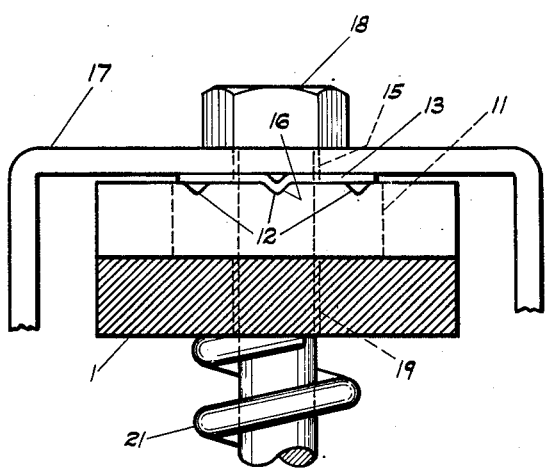
Figure 5 is a fragmentary sectional view taken on line 5—5 of Figure 2.

The lower end of seat bracket 7 has an arcuate slot 11 (Figure 4) curved about the center of bore 8, and a plurality of flutes 12 are formed in the surface of the bracket. Three such flutes are illustrated, and they are arranged along radii passing through the center of bore 8 and preferably are V shaped. A ratchet plate 13 has a bore 14 to receive pivot pin 5, and at the lower end has a circular bore 15 which aligns with slot 11. Ratchet plate 13 has a single median locking rib 16 arranged to be received in one of the flutes 12 of the seat bracket. A yoke 17 is bored to receive a bolt 18 which passes through the hole 15 in the ratchet plate, slot 11 in seat bracket 7, and a hole 19 in seat post 1, and a spring 21 on the end of bolt 18 is retained by a suitable washer and lock nuts 22. The spring passes through an opening 23 in the yoke 17 and engages the seat post 1 so as to resiliently clamp together the seat post, seat bracket, ratchet plate and yoke.

Figure 3:
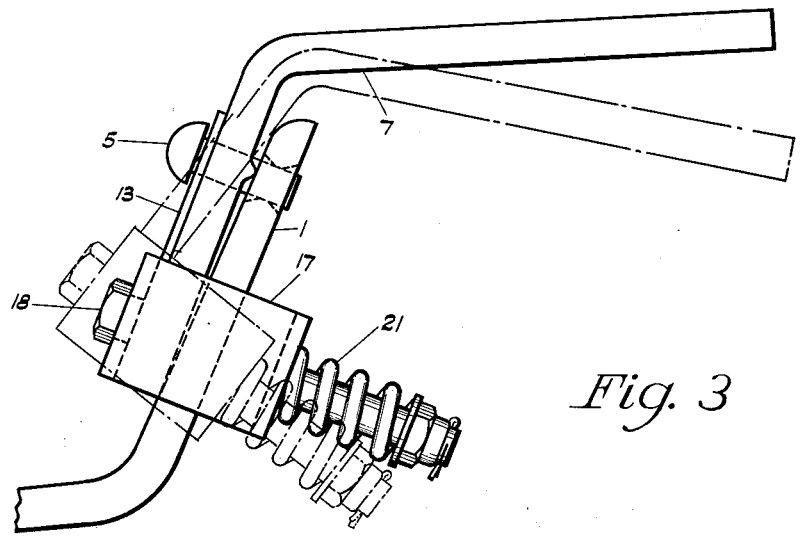
Figure 3 is a side elevation similar to Figure 1.

The operation of the seat now will be described. Jolting of the tractor is cushioned by spring 21 which allows seat bracket 7 to rock on ribs 9 as a fulcrum, the tapered ends 3 and 4 of bore 2 allowing pivot pin 5 to rock with the seat bracket. Ratchet plate 13 is carried with bracket 7 in such rocking motion. Yoke 17 moves with seat bracket 7, as shown in Figure 3, so that ratchet plate 13 is resiliently held in engagement with bracket 7 by yoke 17 and spring 21. Ratchet plate 13 is held against turning about pivot 5 by the bolt 18 and thus the median rib 16 in the ratchet plate is held in a rib 12 of the seat bracket to prevent dislodgement of the seat when rocked in this manner. Rocking movements of the seat is limited by compression of spring 21, and if desired, the yoke may engage seat post 1 to limit rocking movement of the seat. In the event bolt 18 is accidentally broken the yoke will prevent the seat dropping back so far as to throw the operator from the seat. Thus, the seat is resiliently cushioned, so that it can resiliently rock up and down as shown by dot and dash lines in Figure 1.

Figure 2:
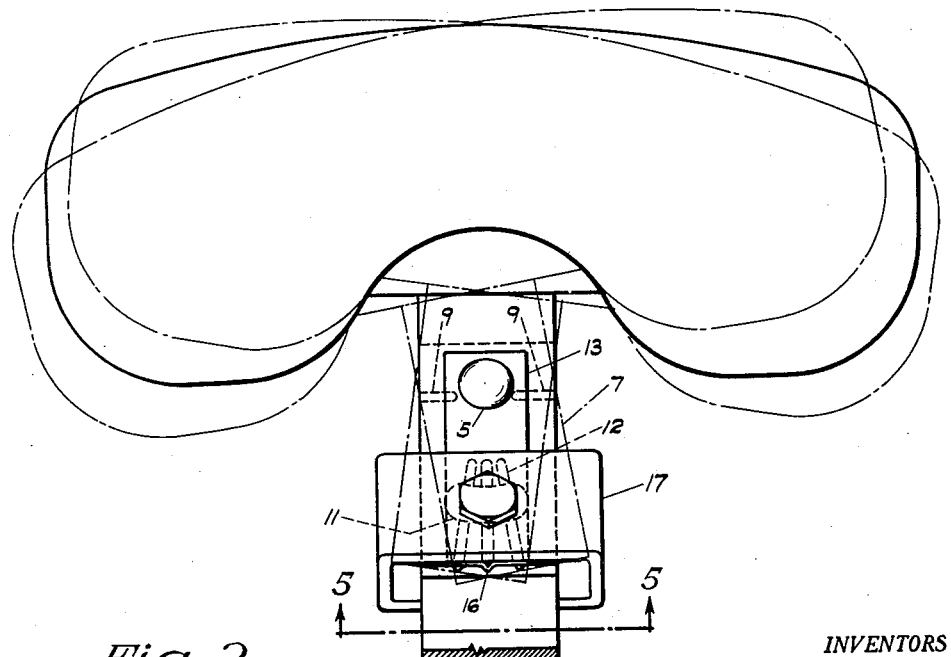
Figure 2 is a front elevation of Figure 1.

To tilt or cant the seat, the operator exerts a sudden push along one edge of the seat, thereby causing the seat bracket 7 to pivot about pin 5 and causes the middle flute 12 in the seat bracket to ride over the median rib 16 of the ratchet plate, until the median rib engages in one of the side flutes 12 of the seat bracket, the spring 21 allowing sufficient separation between the lower ends of bracket 7 and ratchet plate 13 to allow this movement. The seat thus can be tilted or canted to the positions shown in dot and dash lines in Figure 2. The ribs 9 provide a bearing surface for such canting movement and reduce frictional resistance to adjustment. In the canted position the seat is resiliently cushioned by spring 21 as above described so as to be capable of resilient up and down rocking. The spring holds the ratchet plate 13 and seat bracket 7 in sufficiently firm engagement to prevent the rib 16 riding out of a flute 12 by the weight of the operation under normal operating conditions. The yoke may serve as a stop to limit canting of the seat in the event the rib 16 accidentally rides past the last flute, or this purpose may be served by the ends of arcuate slot 11. However, the force necessary to adjust the seat can be developed by a sudden shove downward at the side edge of the seat.

The seat illustrated herein provides a simple and inexpensive cushioned construction which can be canted or cocked sidewise without the use of tools and retains its cushioning action in canted position. This adjustment can be made by the operator without leaving his seat. The ability of the seat to cant enables the tractor operator to adjust the seat so that he can sit substantially erect even though the tractor is canted sidewise. This tends to reduce fatigue of the operator. Various modifications may be made in the construction illustrated without departing from the spirit or scope of the invention.

We claim as our invention:

1. An adjustable seat for a tractor or the like comprising: a seat post; a seat bracket pivoted on a horizontal axis to the seat post and rotatable about said axis; said seat bracket having a transverse slot adjacent one end; a ratchet plate having an aperture in alignment with said slot, said seat bracket and ratchet plate having cooperating means to retain said bracket and plate in fixed relation; a pin passing through said aperture and slot; and means yieldingly holding said plate and bracket in engagement.

2. A seat as specified in claim 1 wherein said bracket axis allows vertical rocking movement of said seat bracket and ratchet plate thereon.

3. A seat as specified in claim 2 having means for limiting rocking movement of said seat.

4. An adjustable seat for a tractor or the like comprising: a seat post; a seat bracket pivoted on a horizontal axis on said seat post and mounted for vertical rocking movement thereon; a plate on said seat bracket, said plate and bracket having cooperating ratchet means; said plate and bracket having a bore and a slot respectively in alignment; a yoke; a pin passing through said bore, slot and yoke; and a spring on said pin holding said plate and bracket in yielding engagement.

5. An adjustable seat for a tractor or the like comprising: a seat post; a seat bracket; a ratchet plate; a pivot pin passing horizontally through the seat post, seat bracket and ratchet plate and providing an axis for rotation of the seat bracket, a raised fulcrum between the seat post and seat bracket; said seat bracket having a slot adjacent one end; and said ratchet plate having an aperture in alignment with said slot, said seat bracket and ratchet plate having cooperating means to retain said bracket and plate in fixed relation; a yoke; a pin passing through said aperture, slot and yoke; and means yieldingly holding said ratchet plate, bracket and yoke in engagement.

6. An adjustable seat for a tractor or the like comprising: a seat post adapted to carry a seat; an angular seat bracket pivoted on a substantially horizontal axis on the seat post and rotatable about said axis; means yieldingly clamping said seat post and bracket together; and ratchet means cooperating with the seat post and bracket and held in engagement by said clamping means for resiliently supporting the seat bracket and yieldably holding said bracket and post in adjusted angular relation.

7. An adjustable seat for a tractor or the like comprising: a seat post adapted to carry a seat; an angular seat bracket pivoted on a substantially horizontal axis on the seat post and rotatable about said axis; a plate held in fixed position relative to the seat post and having ratchet means cooperating with complementary ratchet means on the seat bracket for holding said bracket and post in predetermined angular positions; and spring means yieldingly clamping said ratchet plate, seat post and bracket together for resiliently supporting the seat bracket and releasably maintaining said seat in adjusted position.

8. An adjustable seat for a tractor or the like comprising: a substantially rigid seat post; a substantially rigid angular seat bracket pivoted on a substantially horizontal axis on the seat post and rotatable about said axis; said seat bracket having a transverse slot adjacent one end in alignment with a hole through said post; a pin passing through said hole and slot; ratchet means interposed between said post and bracket; and spring means on said pin yieldingly holding said post and bracket in engagement with said ratchet means for resiliently supporting the seat bracket and releasably maintaining said ratchet means in adjusted position.

WM. J. PREISING.
ROY H. BYNUM.

REFERENCES CITED

The following references are of record in the file of this patent:

UNITED STATES PATENTS

| Number | Name | Date |
|---|---|---|
| 1,385,742 | Eakin | July 26, 1921 |
| 1,932,241 | Brown | Oct. 24, 1933 |

FOREIGN PATENTS

| Number | Country | Date |
|---|---|---|
| 166,109 | Switzerland | Dec. 15, 1932 |